(12) United States Patent
Uchida

(10) Patent No.: US 10,696,886 B2
(45) Date of Patent: Jun. 30, 2020

(54) THERMALLY CONDUCTIVE ELASTOMER COMPOSITION AND THERMALLY CONDUCTIVE MOLDED ARTICLE

(71) Applicant: KITAGAWA INDUSTRIES CO., LTD., Inazawa-shi, Aichi (JP)

(72) Inventor: Tatsuya Uchida, Kasugai (JP)

(73) Assignee: KITAGAWA INDUSTRIES CO., LTD., Aichi (JP)

( * ) Notice: Subject to any disclaimer, the term of this patent is extended or adjusted under 35 U.S.C. 154(b) by 134 days.

(21) Appl. No.: 16/093,732

(22) PCT Filed: Nov. 2, 2017

(86) PCT No.: PCT/JP2017/039677
§ 371 (c)(1),
(2) Date: Oct. 15, 2018

(87) PCT Pub. No.: WO2018/092593
PCT Pub. Date: May 24, 2018

(65) Prior Publication Data
US 2019/0127621 A1    May 2, 2019

(30) Foreign Application Priority Data
Nov. 15, 2016  (JP) .................................. 2016-222420

(51) Int. Cl.
*C09K 5/14*  (2006.01)
*C08L 91/00*  (2006.01)
(Continued)

(52) U.S. Cl.
CPC ................ *C09K 5/14* (2013.01); *C08L 53/02* (2013.01); *C08L 91/00* (2013.01); *C08K 3/04* (2013.01);
(Continued)

(58) Field of Classification Search
CPC . C09K 5/14; C08L 53/02; C08L 91/00; C08L 23/16; C08L 53/025; C08K 3/04;
(Continued)

(56) References Cited

U.S. PATENT DOCUMENTS 8,653,176 B2    2/2014   Nakamichi et al.
2010/0012884 A1   1/2010  Nakamichi et al.

FOREIGN PATENT DOCUMENTS

JP    2001-19772    1/2001
JP    2001-30431    2/2001
(Continued)

OTHER PUBLICATIONS

International Search Report dated Jan. 23, 2018 in International Application No. PCT/JP2017/039677.

*Primary Examiner* — Josephine L Chang
(74) *Attorney, Agent, or Firm* — Wenderoth, Lind & Ponack, L.L.P.

(57) ABSTRACT

Provided is a thermally conductive elastomer composition excellent in thermal conductivity, insulation property, low hardness property, moldability, and the like.
[Solving Means] The thermally conductive elastomer composition of the present invention including: a styrene-based elastomer in an amount of 100 parts by mass; a process oil in an amount of 800 to 1,000 parts by mass including a petroleum-based hydrocarbon; an aluminum hydroxide powder in an amount of 240 to 290 parts by mass; and an artificial graphite powder in a platelike form with an average particle size of 8 μm to 30 μm, or a natural graphite powder in a flake form or a vein form with an average particle size of 8 μm to 30 μm, in an amount of 270 to 400 parts by mass.

5 Claims, 1 Drawing Sheet

(51) Int. Cl.
  *C08L 53/02* (2006.01)
  *C08K 3/04* (2006.01)
  *C08K 7/00* (2006.01)
  *C08L 23/16* (2006.01)
  *C08K 3/22* (2006.01)

(52) U.S. Cl.
  CPC ........ *C08K 7/00* (2013.01); *C08K 2003/2227* (2013.01); *C08K 2201/003* (2013.01); *C08K 2201/005* (2013.01); *C08L 23/16* (2013.01)

(58) Field of Classification Search
  CPC .............. C08K 7/00; C08K 2003/2227; C08K 2201/003; C08K 2201/005
  USPC ....................................................... 524/437
  See application file for complete search history.

(56) References Cited

FOREIGN PATENT DOCUMENTS

| | | |
|---|---|---|
| JP | 2006-176766 | 7/2006 |
| JP | 2006-193626 | 7/2006 |
| JP | 2015-193785 | 11/2015 |
| WO | 2008/084512 | 7/2008 |

THERMALLY CONDUCTIVE ELASTOMER COMPOSITION AND THERMALLY CONDUCTIVE MOLDED ARTICLE

TECHNICAL FIELD

The present invention relates to a thermally conductive elastomer composition and a thermally conductive molded article.

BACKGROUND ART

As a member for releasing a heat generated from an electronic component and the like in an electronic device to the outside, currently used is, for example, a thermally conductive molded article that includes a thermally conductive filler, with using a styrene-based elastomer as a base polymer, as shown in Patent Document 1. A thermally conductive molded article of this type is used, for example, by being interposed between an electronic component mounted on a substrate and a heat radiator such as a heat radiation plate, to transfer a heat generated from the electronic component to the heat radiator.

When a gap is formed between the thermally conductive molded article and an electronic component or between the thermally conductive molded article and a heat radiator, a heat radiation efficiency is lowered. Therefore, a thermally conductive molded article is required to have a flexibility (a low hardness property) that allows the molded article to follow a form of an electronic component and the like. A thermally conductive molded article is also required to have an insulation property, from a viewpoint of ensuring a normal operation of an electronic component and the like.

In this connection, as the thermally conductive filler, an expandable graphite is currently used.

RELATED ART DOCUMENT

Patent Document

Patent Document 1: Japanese Unexamined Patent Application Publication No. 2015-193785

Problem to be Solved by the Invention

A thermally conductive molded article that contains an expandable graphite as the thermally conductive filler, with using a styrene-based elastomer as a base polymer as described above has an insufficient insulation property, which has been a problem.

DISCLOSURE OF THE PRESENT INVENTION

An object of the present invention is to provide a thermally conductive elastomer composition excellent in thermal conductivity, insulation property, low hardness property, moldability, and the like, and a molded article thereof.

Means for Solving the Problem

As a result of intensive studies to achieve the above object, the inventor of the present invention has found that a thermally conductive elastomer composition including a styrene-based elastomer and a process oil and includes an artificial graphite powder or a natural graphite powder with a specific average particle size and a specific form, together with an aluminum hydroxide powder as a thermally conductive filler, is excellent in thermal conductivity, insulation property, low hardness property, moldability, and the like, and has accomplished the present invention.

Means for solving the above problems are as follows.

<1> A thermally conductive elastomer composition comprising: a styrene-based elastomer in an amount of 100 parts by mass; a process oil in an amount of 800 to 1,000 parts by mass including a petroleum-based hydrocarbon; an aluminum hydroxide powder in an amount of 240 to 290 parts by mass; and an artificial graphite powder in a platelike form with an average particle size of 8 µm to 30 µm or a natural graphite powder in a flake form or a vein with an average particle size of 8 µm to 30 µm in an amount of 270 to 400 parts by mass.

<2> In the thermally conductive elastomer composition according to <1>, the aluminum hydroxide powder may have an average particle size of 1 µm to 30 µm.

<3> The thermally conductive elastomer composition according to <1> or <2>, may further include an olefin-based resin in an amount of 19 to 23 parts by mass with respect to 100 parts by mass of the styrene-based elastomer.

<4> In the thermally conductive elastomer composition according to any one of <1> to <3>, the artificial graphite powder may be blended in an amount of 340 to 400 parts by mass.

<5> A thermally conductive molded article comprising the thermally conductive elastomer composition according to any one of <1> to <4>.

Advantageous Effect of the Invention

According to the present invention, it is possible to provide a thermally conductive elastomer composition excellent in thermal conductivity, insulation property, low hardness property, moldability, and the like, and a molded article thereof.

MODE FOR CARRYING OUT THE INVENTION

[Thermally Conductive Elastomer Composition]

Figure 1:
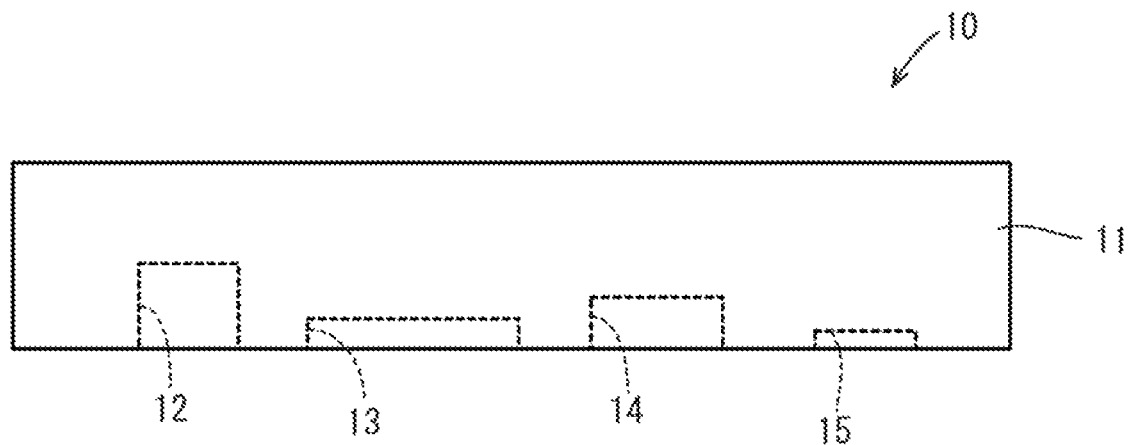
FIG. 1 is a side view schematically illustrating an example of a thermally conductive molded article.

Thermally conductive elastomer composition I of the present embodiment includes, as a thermally conductive filler, a platelike artificial graphite powder, together with an aluminum hydroxide powder. Specifically, the thermally conductive elastomer composition I comprises 100 parts by mass of a styrene-based elastomer, 800 to 1,000 parts by mass of a process oil including a petroleum-based hydrocarbon, 240 to 290 parts by mass of an aluminum hydroxide powder, and 270 to 400 parts by mass of a platelike artificial graphite powder with an average particle size of 8 µm to 30 µm, blended together.

Thermally conductive elastomer composition II according to another embodiment includes 100 parts by mass of a styrene-based elastomer, 800 to 1,000 parts by mass of a process oil including a petroleum-based hydrocarbon, 240 to 290 parts by mass of an aluminum hydroxide powder, and 340 to 400 parts by mass of a natural flake or vein graphite powder with an average particle size of 8 µm to 30 µm, blended together.

Hereinbelow, each material constituting the thermally conductive elastomer compositions I and II will be described. In the present description, the thermally conductive elastomer composition I and the thermally conductive elastomer composition II are sometimes referred to as "thermally conductive elastomer composition", collectively.

(Styrene-Based Elastomer)

The styrene-based elastomer is a base polymer of the thermally conductive elastomer composition, and one having a thermoplasticity, a moderate elasticity, and the like is preferably used. Examples of the styrene-based elastomer may include hydrogenated styrene isoprene butadiene block copolymer (SEEPS), styrene isoprene styrene block copolymer (SIS), styrene isobutylene copolymer (SIBS), styrene butadiene styrene block copolymer (SBS), styrene ethylene propylene block copolymer (SEP), styrene ethylene butylene styrene block copolymer (SEBS), and styrene ethylene propylene styrene block copolymer (SEPS). These may be used alone or in combination of two or more.

Preferred styrene-based elastomer is one obtained by hydrogenating a block copolymer including a polymer block A composed mainly of at least two vinyl aromatic compounds and a polymer block B including at least one conjugated diene compound.

Examples of the vinyl aromatic compounds may include styrene, α-methylstyrene, o-methylstyrene, m-methylstyrene, p-methylstyrene, 1,3-dimethylstyrene, and vinylnaphthalene, vinylanthracene. Among them, styrene and α-methylstyrene are preferred. As the aromatic vinyl compound, one kind may be used alone, or two or more kinds thereof may be used in combination.

A content of the vinyl aromatic compound in the styrene-based elastomer is preferably 5 to 75% by mass, and more preferably 5 to 50% by mass. When the content of the vinyl aromatic compound is in this range, an elasticity of the thermally conductive elastomer composition is easily ensured.

Examples of the conjugated diene compound may include butadiene, isoprene, 2,3-dimethyl-1,3-butadiene, 1,3-pentadiene, and 1,3-hexadiene. As the conjugated diene compound, one kind may be used alone, or two or more kinds may be used in combination. Among the above, the conjugated diene compound is preferably at least one kind selected from isoprene and butadiene, and more preferably a mixture of isoprene and butadiene.

In the styrene-based elastomer, it is preferred that 50% or more of carbon-carbon double bond derived from the conjugated diene compound of the polymer block B be hydrogenated, more preferably 75% or more of the same be hydrogenated, and particularly preferably 95% or more of the same be hydrogenated.

The styrene-based elastomer only needs to include at least each one of the polymer block A and the polymer block B. However, from viewpoints of thermal resistance, mechanical properties, and the like, it is preferred that the styrene-based elastomer include two or more of the polymer blocks A and one or more of the polymer blocks B. Bonding mode of the polymer block A and the polymer block B may be linear, branched, or any combination thereof, and examples thereof may include, when the polymer block A is represented by A and the polymer block B is represented by B, a triblock structure represented as A-B-A, a multi-block copolymer represented as (A-B)n or (A-B)n-A (where n represents an integer of 2 or more). Among them, the triblock structure represented as A-B-A is particularly preferred from viewpoints of thermal resistance, mechanical property, handleability, and the like.

A weight average molecular weight of the styrene-based elastomer is preferably 80,000 to 400,000, and more preferably 100,000 to 350,000. In this connection, a weight average molecular weight in the present description refers to a weight average molecular weight in terms of standard polystyrene measured by gel permeation chromatography (GPC). Measurement conditions of the weight average molecular weight are as follows.

<Measurement Conditions>

GPC: LC Solution (manufactured by SHIMADZU)

Detector: Differential refractive index detector RID-10A (manufactured by SHIMADZU)

Column: TSKgel G4000Hxl (manufactured by TOSOH), 2 columns connected in series

Guard column: TSKguardcolumn Hxl-L (manufactured by TOSOH)

Solvent: Tetrahydrofuran

Temperature: 40° C.

Flow rate: 1 ml/min

Concentration: 2 mg/ml

As the styrene-based elastomer, SEEPS is particularly preferred. Examples of commercially available product of SEEPS that may be used herein include SEPTON (registered trademark) 4033, 4404, 055, 4077, and 4099 manufactured by KURARAY CO., LTD, and the like. Among them, SEPTON (registered trademark) 4055 (weight average molecular weight: 270,000) is particularly preferred as SEEPS, from viewpoints of miscibility or compatibility with another material, moldability, and the like.

(Process Oil)

The process oil has a function of softening a styrene-based elastomer (e.g., SEEPS), and is made of petroleum-based hydrocarbon. The petroleum-based hydrocarbon is not particularly limited as long as the objects of the present invention are not impaired, and for example, paraffin-based hydrocarbon compounds are preferred. That is, as the process oil, paraffin-based process oils are preferred. Among paraffin-based process oils, those having a molecular weight of 400 to 800 are preferred. Specific examples of the paraffin-based process oils may include "Diana Process Oil PW-380 (molecular weight: 750)" (manufactured by Idemitsu Kosan Co., Ltd.).

In the thermally conductive elastomer composition, a blending amount of the process oil with respect to 100 parts by mass of the styrene-based elastomer is 800 to 1,000 parts by mass, preferably 820 to 980 parts by mass, and more preferably 840 to 960 parts by mass.

(Aluminum Hydroxide Powder)

An aluminum hydroxide powder is a collection of particles made of aluminum hydroxide, and is used for impairing a thermal conductivity, a flame retardancy, and the like to a thermally conductive elastomer composition. An average particle size of the aluminum hydroxide powder is not particularly limited as long as the objects of the present invention are not impaired, and for example, preferably 1 μm to 30 μm, more preferably 3 μm to 25 μm, and particularly preferably 5 μm to 15 μm. A form of the aluminum hydroxide powder is not particularly limited as long as the objects of the present invention are not impaired, and a generally available aluminum hydroxide powder in a granular form is used.

An average particle size of the aluminum hydroxide powder refers to a volume-based average particle size (D50) measured by a laser diffraction method. An average particle size may be measured with a laser diffraction type particle size distribution measuring instrument. The average particle sizes of the artificial graphite powder, the natural graphite powder, and the like, which will be described later, are also volume-based average particle sizes (D50) measured by a laser diffraction method.

In the thermally conductive elastomer composition, a blending amount of the aluminum hydroxide powder with respect to 100 parts by mass of the styrene-based elastomer is 240 to 290 parts by mass.

(Platelike Artificial Graphite Powder)

In the thermally conductive elastomer composition I, a platelike artificial graphite powder is utilized as a thermally conductive filler. An artificial graphite powder is a collection of particles made of an artificial graphite. The artificial graphite is a graphite obtained by treating a coke and the like at a high temperature of about 3,000° C., and has less impurities and a higher purity than a natural graphite has. As a form of the artificial graphite, platelike forms and vein forms are known. Examples of those commercially available as a platelike artificial graphite may include those in trade names of "UF-G5", "UF-G10", and "UF-G30" manufactured by Showa Denko K.K., those in trade names of "AGB-32" and "AG-130" manufactured by Ito Graphite Co., Ltd. Examples of those commercially available as an artificial vein graphite may include those in trade names of "AGB-60", "AG.B", and "AGB-5" manufactured by Ito Graphite Co., Ltd.

An artificial graphite powder used in the thermally conductive elastomer composition I has a platelike form and an average particle size of 8 μm to 30 μm. Examples of commercially available products of such an artificial graphite powder may include a product in a trade name of "UF-G30" (average particle size: 10 μm) manufactured by Showa Denko K.K.

Incidentally, an average particle size of an artificial graphite powder used in the thermally conductive elastomer composition I is preferably 8 μm to 20 μm, and more preferably 8 μm to 15 μm.

A bulk specific gravity (g/cm³) of the platelike artificial graphite powder used in the thermally conductive elastomer composition I is preferably 0.25 to 0.35 g/cm³.

In the thermally conductive elastomer composition I, a blending amount of the platelike artificial graphite powder with respect to 100 parts by mass of the styrene-based elastomer is 270 to 400 parts by mass, preferably 340 to 400 parts by mass, and more preferably 345 to 400 parts by mass.

Incidentally, in the present description, the artificial graphite does not include an expandable graphite obtained by chemically treating a natural flake graphite, and an expanded graphite obtained by heating an expandable graphite at a high temperature. The artificial graphite in the present description is non-expansive.

(Natural Flake or Vein Graphite Powder)

In the thermally conductive elastomer composition II, a natural flake or vein graphite powder is utilized as a thermally conductive filler. A natural graphite powder is a collection of particles including a natural graphite. In addition to carbon (C) as a main component, a natural graphite includes silicon dioxide ($SiO_2$), aluminum oxide ($Al_2O_3$), and the like as impurities. A form of a natural graphite varies depending on producing place, and those have been known are flake forms, vein forms, and amorphous forms.

Natural flake graphite is a graphite that has a large aspect ratio and is produced in mines mainly in China, the United States, India, Brazil, and the like. Examples of those commercially available as a natural flake graphite may include those in trade names of "PA-99" and "PS-99" manufactured by Nishimura Graphite Co., Ltd. Natural vein graphite is a graphite that has a small aspect ratio and is produced in mines in Sri Lanka. Examples of those commercially available as a natural vein graphite may include natural vein graphites manufactured by Nishimura Graphite Co., Ltd (average particle size: 10 μm, average particle size: 25 μm). Natural amorphous graphite is a graphite that is in a state of clod, is produced in mines mainly in China, South Korea, and North Korea, and has a hydrophilicity superior to that of natural flake graphite. Examples of those commercially available as a natural amorphous graphite may include those in trade names of "S fine powder" and "Special fine powder" manufactured by Nishimura Graphite Co., Ltd.

A natural graphite powder used in the thermally conductive elastomer composition II has a flake form and an average particle size of 8 μm to 30 μm, or a vein form and an average particle size of 8 μm to 30 μm.

Examples of commercially available products of the natural graphite powder that has a flake form and an average particle size of 8 μm to 30 μm may include those in trade names of "PA-99" (average particle size: 26 μm) and "PS-99" (average particle size: 8.5 μm) manufactured by Nishimura Graphite Co., Ltd.

Incidentally, an average particle size of a natural flake graphite powder used in the thermally conductive elastomer composition II is preferably 8 μm to 10 μm.

Examples of commercially available products of the natural graphite powder that has a vein form and an average particle size of 8 μm to 30 μm may include natural vein graphites (average particle size: 10 μm, average particle size: 25 μm) manufactured by Nishimura Graphite Co., Ltd.

Incidentally, an average particle size of a natural vein graphite powder used in the thermally conductive elastomer composition II is preferably 20 μm to 30 μm.

An ash content of a natural flake or a vein graphite powder used in the thermally conductive elastomer composition II is preferably 0.55 to 1.0% by mass.

A bulk specific gravity (g/cm³) of a natural flake or a vein graphite powder used in the thermally conductive elastomer composition II is preferably 0.15 to 0.35 g/cm³.

In the thermally conductive elastomer composition II, a blending amount of the natural flake or the vein graphite powder with respect to 100 parts by mass of the styrene-based elastomer is 340 to 400 parts by mass, preferably 370 to 400 parts by mass, and more preferably 380 to 400 parts by mass.

(Other Additives)

The thermally conductive elastomer composition may further include an olefin-based resin, a heavy metal deactivator, an antioxidant, and the like.

An olefin-based resin impairs a fluidity and the like to a thermally conductive elastomer composition, for example, at the time of manufacture or molding of the thermally conductive elastomer composition. Examples of the olefin-based resin may include polyethylene (PE), polypropylene (PP), and ethylene propylene copolymer. In the thermally conductive elastomer composition, a blending amount of the olefin-based resin with respect to 100 parts by mass of the styrene-based elastomer is preferably 19 to 23 parts by mass.

The heavy metal deactivator is not limited as long as it does not impair the objects of the present invention, and for example, N'1,N'12-bis(2-hydroxybenzoyl) dodecanedihydrazide, or the like is utilized. In the thermally conductive elastomer composition, a blending amount of the heavy metal deactivator with respect to 100 parts by mass of the styrene-based elastomer is preferably 4 to 6 parts by mass.

The antioxidant is not limited as long as it does not impair the objects of the present invention, and for example, a hindered phenol-based antioxidant, an amine-based antioxidant, or the like is utilized. In the thermally conductive elastomer composition, a blending amount of the antioxidant with respect to 100 parts by mass of the styrene-based elastomer is preferably 4 to 6 parts by mass.

The thermally conductive elastomer composition may further include an ultraviolet inhibitor, a colorant (pigment, dye), a thickener, a filler, a thermoplastic resin other than olefin-based resins, a surfactant, or the like blended thereto, as long as the objects of the present invention are not impaired.

A thermally conductive elastomer composition as described above is excellent in thermal Conductivity, insulation property, low hardness property, moldability, light weight property, and the like. A thermally conductive molded article obtained from the thermally conductive elastomer composition is also excellent in thermal conductivity, insulation property, low hardness property, moldability, light weight property, and the like.

A thermal conductivity coefficient of the thermally conductive elastomer composition is preferably 0.58 W/m·K or more, and more preferably 0.60 W/m·K or more. An upper limit of thermal conductivity coefficient of the thermally conductive elastomer composition is not particularly limited, and is, for example, 1.0 W/m·K.

A volume resistivity of the thermally conductive elastomer composition is preferably $1 \times 1.0^{12}$ Ωcm or more.

A hardness (Asker C hardness) of the thermally conductive elastomer composition is preferably 7 to 13. When a hardness (Asker C hardness) of the thermally conductive elastomer composition is in such a range, an object of the thermal countermeasure (e.g., a substrate) is inhibited from being applied with an unnecessary load. The thermally conductive elastomer composition is also equipped with a function of absorbing a vibration or an impact to protect an object.

A specific gravity of the thermally conductive elastomer composition is preferably 1.00 to 1.20 $g/cm^3$. When a thermally conductive elastomer composition has a specific gravity in such a range, the thermally conductive elastomer composition is suitably used in a usage where a weight reduction is desired.

In addition, the thermally conductive elastomer composition has a reduced total content of the thermally conductive filler (an aluminum hydroxide powder, and an artificial graphite powder or a natural graphite powder). A total content of the thermally conductive filler in the thermally conductive elastomer composition I is 510 to 690 parts by mass, and a total content of the thermally conductive filler in the thermally conductive elastomer composition II is 580 to 690 parts by mass. Since the total content of the thermally conductive filler is thus small, a thermally conductive molded article obtained from the thermally conductive elastomer composition is hard to be worn out and is excellent in form stability (dimensional stability).

[Thermally Conductive Molded Article]

The thermally conductive molded article is formed by molding the thermally conductive elastomer composition into a specific form. A method for molding the thermally conductive molded article is not particularly limited as long as it is a general method for molding a thermoplastic elastomer (e.g., a styrene-based elastomer), and examples thereof may include injection moldings, and sheet moldings utilizing a press or a T die.

The thermally conductive molded article is utilized, for example, as a member (thermally conductive member) for releasing a heat generated from an electronic component in an electronic device and the like, to outside. The thermally conductive molded article is utilized as a thermal countermeasure for or a protection of a substrate in a device of an electronic device and the like.

Examples of electronic device in which the thermally conductive molded article is used may include portable devices such as smartphones, portable game devices, portable televisions, tablet terminals, and devices other than portable devices.

FIG. 1 is a side view schematically illustrating an example of a thermally conductive molded article 10. A thermally conductive molded article 10 is molded by using a thermally conductive elastomer composition as a material, and a specific metal mold. To give an overview, the thermally conductive molded article 10 is equipped with a main body 11 that is a substantially flat parallelepiped, and a plurality of concavely recessed housing portions 12, 13, 14, and 15 on the back side. Each of the housing portions 12, 13, 14, and 15 is formed in conformity with individual forms of heat radiation objects.

Figure 2:
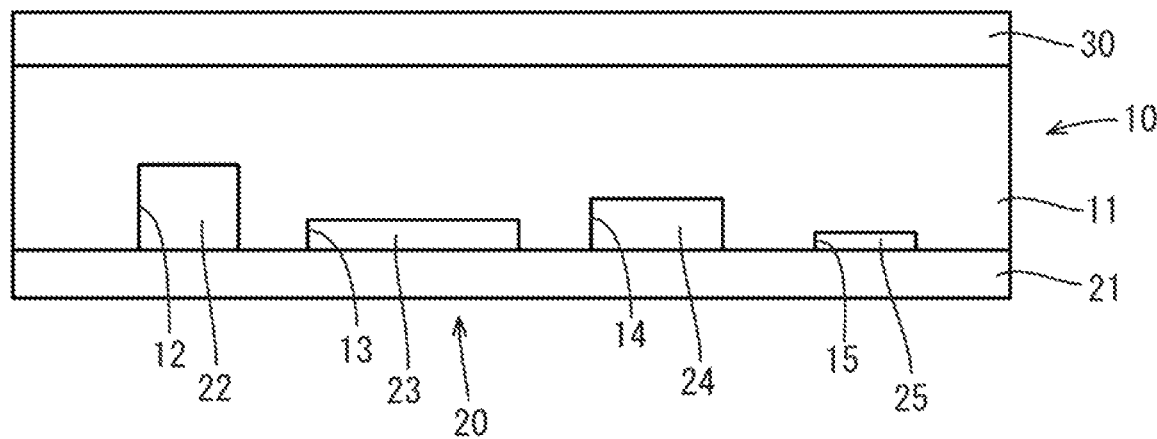
FIG. 2 is a cross-sectional view schematically illustrating a state where a thermally conductive molded article is fitted on a heat radiation object.

FIG. 2 is a cross-sectional view schematically illustrating a state where a thermally conductive molded article 10 is fitted on a heat radiation object 20. The thermally conductive molded article 10 is fitted in such a manner that the thermally conductive molded article 10 is placed on a substrate device that is the heat radiation object 20. The substrate device is equipped with a substrate 21, and a plurality of electronic components 22, 23, 24, and 25 that are mounted on the substrate 21. Each of the housing portions 12, 13, 14, and 15 of the thermally conductive molded article 10 respectively covers the electronic components (heat generating portions) 22, 23, 24, and 25 on the substrate 21, in a close contact manner. A heat radiation plate 30 made of metal is placed on the front side of the thermally conductive molded article 10. Heat generated from each of the electronic components 22 and the like of the heat radiation object 20 transfers to the thermally conductive molded article 10, and further transfers to the heat radiation plate 30, to thereby cool each of the electronic components 22 and the like of the heat radiation object 20.

As described above, for having a shape that follows a form of a heat radiation object, the thermally conductive molded article can reliably fit on the heat radiation object in a close contact manner and function as a thermal countermeasure or a protection.

A form of the thermally conductive molded article may be configured suitably according to a purpose, and can be a sheet form, for example.

EXAMPLES

Hereinbelow, the present invention will be described further in detail, on the basis of Examples. It should be noted that the present invention is not limited to these Examples, at all.

Examples 1 to 10, Comparative Examples 1 to 16

(Production of Composition)

A process oil, an olefin-based resin, a heavy metal deactivator, an antioxidant, an aluminum hydroxide, and a graphite are blended at the proportions (parts by mass) shown in Tables 1-1 to 1-2 and Table 2 with respect to 100 parts by mass of the styrene-based elastomer. The obtained mixtures were kneaded to be mixed for 7 minutes under conditions of 100 rpm and 200° C. by using LABO PLASTOMILL (a twin-screw extruder, product name "4C150-1", manufactured by Toyo Seiki Seisaku-sho, Ltd.) to obtain each of the compositions of Examples 1 to 10 and Comparative Examples 1 to 16.

The materials used in each of the Examples and the Comparative Examples are as follows.

"Styrene-based elastomer": SEEPS, Trade name: "SEPTON 4055", manufactured by KURARAY CO., LTD.

"Process oil": Petroleum-based hydrocarbon, trade name "Diana Process Oil PW 380", manufactured by Idemitsu Kosan Co., Ltd.

"Olefin-based resin": Ethylene propylene copolymer, trade name "Prime Polypro J2021GR", manufactured by Prime Polymer Co., Ltd.

"Heavy metal deactivator": N'1, N'12-bis(2-hydroxybenzoyl) dodecanedihydrazide, trade name "ADEKA STAB CDA-6", manufactured by ADEKA Corporation "Antioxidant": Pentaerythritol tetrakis [3-(3,5-di-tert-butyl-4-hydroxyphenyl) propionate] (hindered phenol-based antioxidant), trade name "IRGANOX #1010", manufactured by BASF Japan Ltd.

"Aluminum hydroxide": Average particle size 10 μm, spherical, trade name "BF083", manufactured by Nippon Light Metal Company, Ltd.

"Artificial graphite (10 μm, platelike)": Average particle size 10 μm, true specific gravity 2.2 g/cm$^3$, bulk specific gravity 0.3 g/cm$^3$, platelike, trade name "UF-G30", manufactured by Showa Denko K.K.

"Artificial graphite (5 μm, platelike)": Average particle size 5 μm, true specific gravity 2.2 g/cm$^3$, bulk specific gravity 0.3 g/cm$^3$, platelike, trade name "UF-G10", manufactured by Showa Denko K.K.

"Artificial graphite (80 μm, platelike)": Average particle size 80 μm, true specific gravity 2.2 g/cm$^3$, bulk specific gravity 0.64 g/cm$^3$, platelike, trade name "AGB-130", manufactured by Ito Graphite Co., Ltd.

"Artificial graphite (25 μm, vein)": Average particle size 25 μm, true specific gravity 2.2 g/cm$^3$, bulk specific gravity 0.53 g/cm$^3$, vein, trade name "AGB-60", manufactured by Ito Graphite Co., Ltd.

"Artificial graphite (10 μm, vein)": Average particle size 10 μm, true specific gravity 2.2 g/cm$^3$, bulk specific gravity 0.43 g/cm$^3$, vein, trade name "AG.B", manufactured by Ito Graphite Co., Ltd.

"Artificial graphite (5 μm, vein)": Average particle size 5 μm, true specific gravity 2.2 g/cm$^3$, bulk specific gravity 0.21 g/cm$^3$, vein, trade name "AGB-5", manufactured by Ito Graphite Co., Ltd.

"Natural graphite (26 μm, flake)": Average particle size 26 μm, true specific gravity 2.2 g/cm$^3$, bulk specific gravity 0.31 g/cm$^3$, flake, ash content 0.60%, trade name "PA-99", manufactured by Nishimura Graphite Co., Ltd.

"Natural graphite (8.5 μm, flake)": Average particle size 8.5 μm, true specific gravity 2.2 g/cm$^3$, bulk specific gravity 0.15 g/cm$^3$, flake, ash content 0.60%, trade name "PS-99", manufactured by Nishimura Graphite Co., Ltd.

"Natural graphite (10 μm, vein)": Average particle size 10 μm, true specific gravity 2.2 g/cm$^3$, bulk specific gravity 0.15 g/cm$^3$, vein, Ash content 0.71%, manufactured by Nishimura Graphite Co., Ltd.

"Natural graphite (25 μm, vein)": Average particle size 25 μm, true specific gravity 2.2 g/cm$^3$, bulk specific gravity 0.31 g/cm$^3$, vein, ash content 0.71%, manufactured by Nishimura Graphite Co., Ltd.

"Natural graphite (9.3 μm, amorphous)": Average particle size 9.3 μm, true specific gravity 2.2 g/cm$^3$, bulk specific gravity 0.26 g/cm$^3$, amorphous, ash content 15.4%, trade name "S fine powder" manufactured by Nishimura Graphite Co., Ltd.

"Natural graphite (4.7 μm, amorphous)": Average particle size 4.7 μm, true specific gravity 2.2 g/cm$^3$, bulk specific gravity 0.23 g/cm$^3$, amorphous, ash content 15.4%, trade name "Special fine powder" manufactured by Nishimura Graphite Co., Ltd.

"Expandable graphite (10 μm)": Average particle size 10 μm, expanded, true specific gravity 2.2 g/cm$^3$, bulk specific gravity 0.06 g/cm$^3$, ash content 0.48%, manufactured by Nishimura Graphite Co., Ltd.

"Expandable graphite (250 μm)": Average particle size 250 μm, expanded, true specific gravity 2.2 g/cm$^3$, bulk specific gravity 0.11 g/cm$^3$, ash content 0.48%, manufactured by Nishimura Graphite Co., Ltd.

"Expandable graphite (180 μm)": Average particle size 180 μm, unexpanded, bulk specific gravity 0.4 to 0.7 g/cm$^3$, trade name "SYZR802", manufactured by SANYO TRADING CO., LTD.

(Production of Molded Articles)

After heating metal molds set in a 50-ton-press machine (product name "hydraulic press molding machine Type-C", manufactured by Iwaki Industry Co., Ltd.) at 180° C. for 1 minute, the compositions described above were put into the metal molds. Subsequently, the metal molds were heated at 180° C. for 1 minute, with being held in the press (pressure condition: about 2 tons), which were then cooled for 2 minutes with being held in a cooling press that had a room temperature. Then, molded articles in a sheet form (60 mm×60 mm×6 mm) were taken out from the metal molds after cooled. In this manner, molded articles made of each of the compositions of Examples 1 to 10 and Comparative Examples 1 to 16 were obtained.

[Evaluation]

The molded articles of Examples 1 to 10 and Comparative Examples 1 to 16 were evaluated for their hardness, thermal conductivity coefficient, volume resistivity, specific gravity, moldability, and flame retardancy, by the methods shown below.

(Hardness)

Two pieces cut into a size of 60 mm×30 mm×6 mm from the molded article of each of the Examples and the like were prepared, which were then superimposed with each other, and used as a test piece (60 mm×30 mm×12 mm) for hardness measurement. In addition, a constant pressure loader for rubber hardness tester (manufactured by Elastron, Inc.) and an Asker C hardness tester were prepared. The test pieces were contacted with an indenter point of the hardness tester, and a value of the hardness tester at a time point 30 seconds after a load was fully applied was read as the hardness (ASKER. Results are shown in Tables 1-1 to 1-2 and Table 2.

(Thermal Conductivity Coefficient)

Four pieces cut into a size of 30 mm×30 mm×6 mm from the molded article of each of the Examples and the like were prepared, from which a pair of two-ply test piece (30 mm×30 mm×12 mm) was prepared. Then, a polyimide sensor was sandwiched between the pair of test pieces, and thermal conductivity coefficient (W/m·K) was measured by a hot disk method. For the measurement, a hot disk thermal property measuring device (product name "TPS500", manufactured by Hot Disk AB) was used. Results are shown in Tables 1-1 to 1-2 and Table 2.

(Volume Resistivity)

The molded article (60 mm×60 mm×6 mm) of each of the Examples and the like was used as a test piece. Volume resistivity (Ω·cm) of each test piece was measured by using a measuring device (product name "Hiresta-UP (MCP-HT450)", manufactured by Mitsubishi Chemical Corporation). In the measurement, the used probe was URS, the applied voltage was 1,000 V, and time (timer) was 10 seconds. Results are shown in Tables 1-1 to 1-2 and Table 2. A measurement results exceeding $9.99 \times 1.0^{13}$ Ω·cm are indicated as "OVER" in Tables 1-1 to 1-2 and Table 2.

(Specific Gravity)

The molded article of each of the Examples and the like was measured for specific gravity (g/cm³) by using a specific gravity measuring balance (product name "AG204", manufactured by Mettler-Toledo K.K. A calculation formula of the specific gravity was as follows. Results are shown in Tables 1-1 to 1-2 and Table 2.

Specific gravity=mass of molded article in atmosphere/(mass of molded article in atmosphere–mass of molded article in water)

(Moldability)

A moldability was judged depending on whether or not a molded article was easily peeled off from a metal mold at a time of molding of the molded article of each of the Examples and the like described above. The molded article was judged as having a "good moldability" when it was easily peeled off from the metal mold, and judged as having a "poor moldability" when it was not easily peeled off from the metal mold. Results are shown in Tables 1-1 to 1-2 and Table 2. In Tables 1-1 to 1-2 and Table 2, the "good moldability" is indicated with a symbol "○", and the "poor moldability" is indicated with a symbol "x".

(Flame Retardancy)

The molded article of each of the Examples and the like was evaluated for flame retardancy in the same manner as in the horizontal burning test of UL99HB. Results are shown in Tables 1-1 to 1-2 and Table 2.

TABLE 1-1

| | EXAMPLES | | | | | |
|---|---|---|---|---|---|---|
| | 1 | 2 | 3 | 4 | 5 | 6 |
| STYRENE-BASED ELASTOMER | 100 | 100 | 100 | 100 | 100 | 100 |
| PROCESS OIL | 950 | 953 | 930 | 900 | 850 | 850 |
| OLEFIN-BASED RESIN | 22.2 | 21.9 | 21.4 | 20.8 | 19.8 | 22.2 |
| HEAVY METAL DEACTIVATOR | | 5.3 | 5.1 | 5 | 4.75 | |
| ANTIOXIDANT | 5.56 | 5.3 | 5.1 | 5 | 4.75 | 5.56 |
| ALUMINUM HYDROXIDE (10 μm, SPHERICAL) | 277.8 | 279 | 272.9 | 265 | 252 | 277.8 |
| ARTIFICIAL GRAPHITE (10 μm, PLATELIKE) | 388.9 | 390 | 381.9 | 370.9 | 353 | 277.8 |
| ARTIFICIAL GRAPHITE (5 μm PLATELIKE) | | | | | | |
| ARTIFICIAL GRAPHITE (80 μm, PLATELIKE) | | | | | | |
| ARTIFICIAL GRAPHITE (25 μm, VEIN) | | | | | | |
| ARTIFICIAL GRAPHITE (10 μm, VEIN) | | | | | | |
| ARTIFICIAL GRAPHITE (5 μm, VEIN) | | | | | | |
| HARDNESS (ASKER C) | 10 | 10 | 9 | 10 | 11 | 11.5 |
| THERMAL CONDUCTIVITY COEFFICIENT (W/m · k) | 0.66 | 0.64 | 0.62 | 0.66 | 0.64 | 0.59 |
| VOLUME RESISTIVITY (Ω · cm) | $2 \times 10^{12}$ | $1 \times 10^{13}$ | $1 \times 10^{13}$ | $1 \times 10^{13}$ | $1 \times 10^{12}$ | $9 \times 10^{12}$ |
| SPECIFIC GRAVITY (g/cm³) | 1.14 | 1.14 | 1.14 | 1.14 | 1.14 | 1.14 |
| MOLDABILITY | GOOD (○) | GOOD (○) | GOOD (○) | GOOD (○) | GOOD (○) | GOOD (○) |
| FLAME RETARDANCY (UL94 HB) | HB | HB | HB | HB | HB | HB |

TABLE 1-2

| | COMPARATIVE EXAMPLES | | | | | | | | | | |
|---|---|---|---|---|---|---|---|---|---|---|---|
| | 1 | 2 | 3 | 4 | 5 | 6 | 7 | 8 | 9 | 10 | 11 |
| STYRENE-BASED ELASTOMER | 100 | 100 | 100 | 100 | 100 | 100 | 100 | 100 | 100 | 100 | 100 |
| PROCESS OIL | 850 | 687.6 | 800 | 1200 | 500 | 687.6 | 800 | 800 | 800 | 800 | 800 |
| OLEFIN-BASED RESIN | 22.2 | 22.2 | 18.7 | 21.9 | 22.2 | 22.2 | 21.9 | 21.9 | 21.9 | 21.9 | 21.9 |
| HEAVY METAL DEACTIVATOR | | | 4.5 | 5.3 | | | 5.3 | 5.3 | 5.3 | 5.3 | 5.3 |
| ANTIOXIDANT | 5.56 | 5.56 | 4.5 | 5.3 | 5.56 | 5.56 | 5.3 | 5.3 | 5.3 | 5.3 | 5.3 |
| ALUMINUM HYDROXIDE (10 μm, SPHERICAL) | 166.7 | 277.8 | 238.5 | 279 | 700 | 555.6 | 279 | 279 | 279 | 279 | 279 |

TABLE 1-2-continued

| | COMPARATIVE EXAMPLES | | | | | | | | | | |
|---|---|---|---|---|---|---|---|---|---|---|---|
| | 1 | 2 | 3 | 4 | 5 | 6 | 7 | 8 | 9 | 10 | 11 |
| ARTIFICIAL GRAPHITE (10 μm, PLATELIKE) | 388.9 | 277.8 | 333.8 | 390.5 | | | | | | | |
| ARTIFICIAL GRAPHITE (5 μm PLATELIKE) | | | | | | | 390.5 | | | | |
| ARTIFICIAL GRAPHITE (80 μm, PLATELIKE) | | | | | | | | 390.5 | | | |
| ARTIFICIAL GRAPHITE (25 μm, VEIN) | | | | | | | | | 390.5 | | |
| ARTIFICIAL GRAPHITE (10 μm, VEIN) | | | | | | | | | | 390.5 | |
| ARTIFICIAL GRAPHITE (5 μm, VEIN) | | | | | | | | | | | 390.5 |
| HARDNESS (ASKER C) | 12 | 20 | 12 | 5 | 30 | 13 | 9 | 8 | 8 | 7 | 7 |
| THERMAL CONDUCTIVITY COEFFICIENT (W/m · K) | 0.72 | 0.64 | 0.60 | 0.54 | 0.48 | 0.35 | 0.63 | 0.46 | 0.44 | 0.41 | 0.45 |
| VOLUME RESISTIVITY (Ω · cm) | $1 \times 10^{10}$ | $1 \times 10^{13}$ | $1 \times 10^{11}$ | $2 \times 10^{13}$ | OVER | OVER | $1 \times 10^{10}$ | OVER | OVER | OVER | OVER |
| SPECIFIC GRAVITY (g/cm³) | 1.14 | 1.14 | 1.14 | 1.11 | 1.25 | 1.18 | 1.14 | 1.14 | 1.14 | 1.14 | 1.14 |
| MOLDABILITY | GOOD (○) | GOOD (○) | GOOD (○) | POOR (X) | GOOD (○) | GOOD (○) | GOOD (○) | GOOD (○) | GOOD (○) | GOOD (○) | GOOD (○) |
| FLAME RETARDANCY (UL94 HB) | HB | HB | HB | HB | HB | HB | HB | HB | HB | HB | HB |

TABLE 2

| | EXAMPLES | | | | COMPARATIVE EXAMPLES | | | | |
|---|---|---|---|---|---|---|---|---|---|
| | 7 | 8 | 9 | 10 | 12 | 13 | 14 | 15 | 16 |
| STYRENE-BASED ELASTOMER | 100 | 100 | 100 | 100 | 100 | 100 | 100 | 100 | 100 |
| PROCESS OIL | 800 | 800 | 800 | 800 | 800 | 800 | 800 | 800 | 800 |
| OLEFIN-BASED RESIN | 21.9 | 21.9 | 21.9 | 21.9 | 21.9 | 21.9 | 21.9 | 21.9 | 21.9 |
| HEAVY METAL DEACTIVATOR | 5.3 | 5.3 | 5.3 | 5.3 | 5.3 | 5.3 | 5.3 | 5.3 | 5.3 |
| ANTIOXIDANT | 5.3 | 5.3 | 5.3 | 5.3 | 5.3 | 5.3 | 5.3 | 5.3 | 5.3 |
| ALUMINUM HYDROXIDE (10 μm, SPHERICAL) | 279 | 279 | 279 | 279 | 279 | 279 | 279 | 279 | 279 |
| NATURAL GRAPHITE (26 μm, FLAKE) | 390.5 | | | | | | | | |
| NATURAL GRAPHITE (8.5 μm, FLAKE) | | 390.5 | | | | | | | |
| NATURAL GRAPHITE (10 μm, VEIN) | | | 390.5 | | | | | | |
| NATURAL GRAPHITE (25 μm, VEIN) | | | | 390.5 | | | | | |
| NATURAL GRAPHITE (9.3 μm, OR 4.7 μm, AMORPHOUS) | | | | | 390.5 (9.3 μm) | 390.5 (4.7 μm) | | | |
| EXPANDABLE GRAPHITE (10 μm, 250 μm, OR 180 μm) | | | | | | | 390.5 (10 μm) | 390.5 (250 μm) | 390.5 (180 μm) |
| HARDNESS (ASKER C) | 10 | 11 | 10 | 10 | 6.5 | 6.5 | 20 | 33 | 18 |
| THERMAL CONDUCTIVITY COEFFICIENT (W/m · K) | 0.58 | 0.62 | 0.59 | 0.64 | 0.39 | 0.40 | 1.00 | 2.00 | 0.90 |
| VOLUME RESISTIVITY (Ω · cm) | $2 \times 10^{13}$ | $2 \times 10^{12}$ | $1 \times 10^{13}$ | OVER | OVER | OVER | $1 \times 10^{5}$ | $1 \times 10^{4}$ | $1 \times 10^{8}$ |
| SPECIFIC GRAVITY (g/cm³) | 1.14 | 1.14 | 1.15 | 1.14 | 1.14 | 1.14 | 1.14 | 1.11 | 1.09 |
| MOLDABILITY | GOOD (○) | GOOD (○) | GOOD (○) | GOOD (○) | POOR (X) | POOR (X) | GOOD (○) | GOOD (○) | GOOD (○) |
| FLAME RETARDANCY (UL94 HB) | HB | HB | HB | HB | HB | HB | HB | HB | HB |

Examples 1 to 6 were cases of including a platelike artificial graphite powder with a specific average particle size. Such Examples 1 to 6 exhibited results showing excellent low hardness property, thermal conductivity, insulation property, light weight property, and flame retardancy.

Examples 7 and 8 were cases of including a natural flake graphite powder with a specific average particle size, and Examples 9 and 10 were cases of including an natural vein graphite with a specific average particle size. Such Examples 7 to 10 exhibited results showing excellent low hardness property, thermal conductivity, insulation property, light weight property, and flame retardancy.

In contrast, Comparative Examples 1 to 16 exhibited results showing an inferiority in any of low hardness property, thermal conductivity, insulation property, light weight property and flame retardancy.

EXPLANATION OF SYMBOLS

10: Thermally conductive molded article
11: Main body
12, 13, 14, and 15: Housing portion
20: Heat radiation object (Substrate device)
21: Substrate
22, 23, 24, and 25: Electronic component (Heat generating portion)
30: Heat radiation plate

The invention claimed is:

1. A thermally conductive elastomer composition comprising:
   a styrene-based elastomer in an amount of 100 parts by mass;
   a process oil in an amount of 800 to 1,000 parts by mass comprising a petroleum-based hydrocarbon;
   an aluminum hydroxide powder in an amount of 240 to 290 parts by mass; and
   an artificial graphite powder in a platelike form with an average particle size of 8 μm to 30 μm, or a natural graphite powder in a flake form or a vein form with an average particle size of 8 μm to 30 μm, in an amount of 270 to 400 parts by mass.

2. The thermally conductive elastomer composition according to claim 1, wherein the aluminum hydroxide powder has an average particle size of 1 μm to 30 μm.

3. The thermally conductive elastomer composition according to claim 1, wherein the artificial graphite powder is blended in an amount of 340 to 400 parts by mass.

4. The thermally conductive elastomer composition according to claim 1, further comprising an olefin-based resin in an amount of 19 to 23 parts by mass with respect to 100 parts by mass of the styrene-based elastomer.

5. A thermally conductive molded article comprising the thermally conductive elastomer composition according to claim 1.

* * * * *